(12) United States Patent
Lin et al.

(10) Patent No.: US 8,959,072 B2
(45) Date of Patent: Feb. 17, 2015

(54) CONTEXT-BASED MULTI-DIMENSIONAL INQUIRING METHOD OF NUMBER ADDRESS BOOK

(75) Inventors: Yu Lin, Beijing (CN); Shihong Zou, Beijing (CN); Mei Zhu, Beijing (CN)

(73) Assignee: Beijing Netqin Technology Co., Ltd, Beijing (CN)

( * ) Notice: Subject to any disclaimer, the term of this patent is extended or adjusted under 35 U.S.C. 154(b) by 414 days.

(21) Appl. No.: 13/259,145

(22) PCT Filed: Mar. 17, 2010

(86) PCT No.: PCT/CN2010/071097
§ 371 (c)(1),
(2), (4) Date: Oct. 17, 2011

(87) PCT Pub. No.: WO2010/108418
PCT Pub. Date: Sep. 30, 2010

(65) Prior Publication Data
US 2012/0036152 A1 Feb. 9, 2012

(30) Foreign Application Priority Data

Mar. 24, 2009 (CN) .......................... 2009 1 0080632

(51) Int. Cl.
*G06F 7/00* (2006.01)
*G06F 17/30* (2006.01)
*H04M 1/2745* (2006.01)
*H04M 1/725* (2006.01)

(52) U.S. Cl.
CPC .... *H04M 1/274558* (2013.01); *H04M 1/72569* (2013.01); *H04M 1/72572* (2013.01)
USPC ........................................................ 707/706

(58) Field of Classification Search
USPC ........................................................ 707/706
See application file for complete search history.

(56) References Cited

U.S. PATENT DOCUMENTS

| 2003/0158855 A1* | 8/2003 | Farnham et al. ............... 707/102 |
| 2008/0205655 A1* | 8/2008 | Wilkins et al. ................ 380/279 |
| 2008/0275865 A1* | 11/2008 | Kretz et al. ....................... 707/5 |

FOREIGN PATENT DOCUMENTS

| CN | 1224294 A | 7/1999 |
| CN | 1564569 A | 1/2005 |
| WO | 2007006864 A2 | 1/2007 |

OTHER PUBLICATIONS

International Search Report for PCT/CN2010/071097 mailed Jun. 24, 2010.

* cited by examiner

*Primary Examiner* — Mariela Reyes
*Assistant Examiner* — Jeffrey Chang
(74) *Attorney, Agent, or Firm* — Scully, Scott, Murphy & Presser, P.C.

(57) ABSTRACT

A method for context-based multi-dimensional searching of contacts in a phone address book is disclosed, the method comprises, inputting the searching field, determining if the searching field matches a certain city name, searching the full visiting card information in the address book, and sorting coordinators in the address book based on the multiple dimensions.

5 Claims, 5 Drawing Sheets

CONTEXT-BASED MULTI-DIMENSIONAL INQUIRING METHOD OF NUMBER ADDRESS BOOK

This application is a National Stage Application under 35 U.S.C. §371 from PCT/CN2010/071097, filed Mar. 17, 2010, which claims priority under 35 U.S.C. §119(a)-(d) to Chinese Application No. CN200910080632.2, filed on Mar. 24, 2009, each of which is hereby incorporated by reference in its entirety for all purposes.

TECHNICAL FIELD

The application relates to an address book searching method for a mobile device, particularly relates to a method for context-based multi-dimensional searching of contacts in a mobile phone book.

BACKGROUND OF THE INVENTION

In prior number address book, coordinators are mostly sorted in ascending order according to initials of names. Such method commonly causes users to pay more time to find target coordinator, and causes much inconvenience to users since the searching scope is limited to finding names. For example, if user only knows partial information of the target coordinator (for example, doesn't knows family name, but only knows first name), the user cannot obtain searching result, or if the user wants to know coordinators in oneself current located region, conventional searching method would be helpless.

To increase inquiring efficiency, the following patent applications explore to adjust sort order of numbers in address book based on communication frequency. Chinese patent application with application No. as 200710138773.6, title as "method, system and apparatus for sorting information and establishing initial network address book" describes a method of sorting coordinators according to active value which is determined by contact record of user's device; Chinese patent application with application No. as 200710162825.3, title as "a method of visiting portable terminal phone directory according to using frequency" describes a method of displaying phone directory according to frequency of user's visiting into phone directory record; Chinese patent application with application No. as "200610165366.A, title as "a swift sorting method" discloses a method of recording execution times of operation items within set time period, and sorting operation items according to execution times; Chinese patent application with application No. as 200510030906.9, title as "a method of sorting and displaying mobile communication terminal number" discloses that each number need an unique index number, an using times variable and displaying sequence number. However, none of the above methods utilize the whole information of coordinators, and the searching scope makes no difference with that of conventional method, thus the searching efficiency cannot be highly increased.

To solve the above problems, the invention attempts to provide a context-based multi-dimensional inquiring method of a number address book, sorting coordinators based on multiple dimensions of communication frequency, belonging relative (group), user's current location, local time, etc during inquiring process, so as to rapidly find target coordinator. Meanwhile, the searching scope is also enlarged to searching full visiting card information from only searching names, and if user inputs a certain city name, the district number of the city would be displayed. The invention is capable of meeting user's requirement of many kinds of searching conditions, greatly saving operation time.

SUMMARY OF THE INVENTION

The application intends to make user to find target coordinator even if he only knows partial information by enlarging the searching scope; and to save inquiring time for user by taking consideration of multiple factors during process of sorting coordinators.

A context-based multi-dimensional inquiring method of a number address book, comprising: inputting a searching field; determining if the searching field matches a certain city name; searching full visiting card information of coordinators in the address book; and sorting target coordinators of the full visiting card information searching result based on multiple dimensions.

When the searching field matches a city name, the city name and corresponding district number are displayed.

The searching full visiting card information in the address book comprising the following steps: determining if the searching field is address; if the searching field is determined as address, matching the input searching field to address information in each coordinator's visiting card, and the successfully matched field type is set as address, no longer searching the coordinator's other information; if the address match fails, matching the searching field to the name information in the coordinator's visiting card, and the successfully matched field type is set as name, no longer searching the coordinator's other information; if the name match fails, matching the searching field to other information in the coordinator's visiting card, and the successfully matched field type is set as others, no longer searching the coordinator's other information; the above procedures are repeated until all coordinators implement field match; and listing items of the target coordinators whose match field types are respectively address, name or others. If the searching field is not determined as address, matching the searching field to name information in the coordinator's visiting card, and the successfully matched field type is set as name, no longer searching the coordinator's other information; if the name match fails, matching the searching field to other information in the coordinator's visiting card, and the successfully matched field type is set as others, no longer searching the coordinator's other information; the above procedures are repeated until all coordinators implement field match; and listing items of the target coordinators whose match field types are respectively name or others.

The target coordinators of the full visiting card information searching result are sorted based on seven dimensions of coordinators' match field type, communication frequency coefficient attribute, address attribute, group, name, user's current address and local time and date of mobile phone.

A context-based multi-dimensional inquiring method of a number address book, comprising: inputting a searching field; determining if the searching field matches a city name or not, if yes, the city name and corresponding district number are displayed; gathering user's current address information, and storing the information; reading local time and date of user's mobile phone; adjusting priority of relevant groups in the searched result on basis of local time and date of the user's mobile phone; searching full visiting card information of all coordinators in the address book, and making vague match among the searching fields to obtain match result; and sorting target coordinators of the full visiting card information searching result based on multiple dimensions.

The user's current address information is determined by GPS information or number segment of user's mobile phone. Adjusting priority of relevant groups comprises: determining if the local time and date of mobile phone is a certain holiday or not, if yes, giving preference to relevant groups of family, relatives and friends and decreasing priority of relevant groups of colleagues and partners; if it's only weekend, giving preference to relevant groups of friends and family and decreasing priority of relevant groups of colleagues, relatives and partners; if it's working day, first determining if the time is working time or not, if yes, giving preference to relevant groups of partners and colleagues and decreasing priority of relevant groups of friends, family and relatives; if it's non-working time, giving preference to relevant groups of family, friends and colleagues and decreasing priority of relevant groups of partners and relatives.

A multi-dimensional based sorting method of coordinators in an address book, comprising: reading address determination result, deciding priority type of first layer region for displaying sorting result; reading determination result of the local time and date of user's mobile phone, and deciding priority of relative groups based on the determination result of the time and date, so as to determine preferential group of second layer region in the said first layer region; and deciding sort order of coordinators in separate relative group in accordance with coordinators' communication frequency coefficient attribute, address attribute and user's current address and name.

When the searching field is address, the priority types of the first layer region are respectively the match field type being address, the match field type being name and the match field type being others; and when the searching field is not address, the priority types of the first layer region are respectively the match field type being name and the match field type being others. When the match field type is address, dividing the first layer region where the match field type is address into a plurality of second layer regions based on group priority, and in each second layer region, sorting coordinators from high to low according to the communication frequency coefficients, and when the communication frequency coefficients are the same, sorting coordinators in ascending order according to initials of coordinators' name.

When the match field type is not address, dividing the first layer region where the match field type is name or others into a plurality of second layer regions based on group priority, and in each second layer region, sorting coordinators from high to low according to the communication frequency coefficients, and when the communication frequency coefficients are the same, placing the coordinator whose address attribute matches user's current address as first, and sorting coordinators in ascending order according to initials of cities, and when the address attributes are the same, sorting coordinators in ascending order according to initials of coordinators' name.

The address attribute is determined by the following steps: scanning relevant address information in coordinators' visiting card, and if valid city name is found, the coordinator's address attribute is the city name; if it's not found a valid city name, inquiring the number segment of the coordinator's phone, and the coordinator's address attribute is corresponding belonging place of the number segment; if number segment inquiring fails, extracting number head information of coordinator's phone and inquiring the district number, and the coordinator's address attribute is corresponding country or city of the district number; and if the above procedures all fail, setting the coordinator's address attribute as corresponding belonging place of user's phone number segment.

The communication frequency coefficient attribute is determined by the following steps: setting original value of coordinator's communication frequency coefficient as 0, and the communication frequency coefficient will be added by 1 every time one short message produces; and the communication frequency coefficient will be added by 1 every time one communication record produces; and the communication frequency coefficient will be added by 1 every time one mail contact produces.

In order to increase searching efficiency of coordinators in address book, the coordinators are sorted again based on multiple dimensions, and definitions of several common dimensions are listed as follows:

Communication frequency coefficient: setting frequency coefficient for coordinators, whose attribute is transparent to user, and the original value of the coefficient is set as 0, which is added by 1 every time one short message/multimedia message produces (send/receive), which is added by 1 every time one communication record produces (answer/dial/not answer), which is added by 1 every time one mail contact produces (receive/send); and every time one coordinator is added, the communication record, send/receive box of short message, multimedia message, and mailbox are automatically searched, and coefficient is counted.

User's current location: user's located city is located by accurate GPS information, and if it fails, the registration city is searched according to phone number, and coordinators in the same city with user take precedence.

Local time and date of mobile phone: the local date and time are obtained from mobile phone, and are determined if it's working time, non-working time or holiday (holiday is separated into weekend and feast day).

Group: according to different time match results, groups are endowed with different priorities, for example, in working time, colleague/partners take precedence, and in non-working time, ball and vehicle friends take precedence, and in holiday, family take precedence, etc.

Match field type: recording successfully matched information type.

Address: recording the city where coordinators are located.

DETAILED DESCRIPTION OF THE PREFERRED EMBODIMENTS

Referring to the accompanying drawings, the embodiments of the invention are described with nonrestrictive examples.

Figure 1:
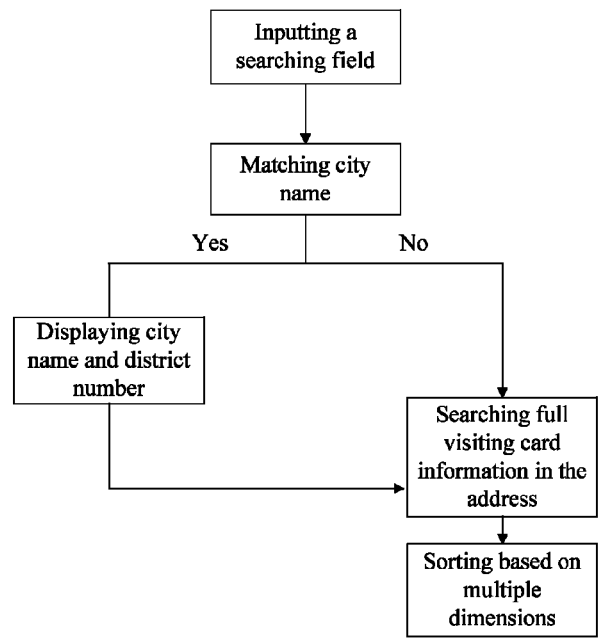
FIG. 1 is a block diagram showing the general flow process of the inquiring method of the invention.
Figure 5:
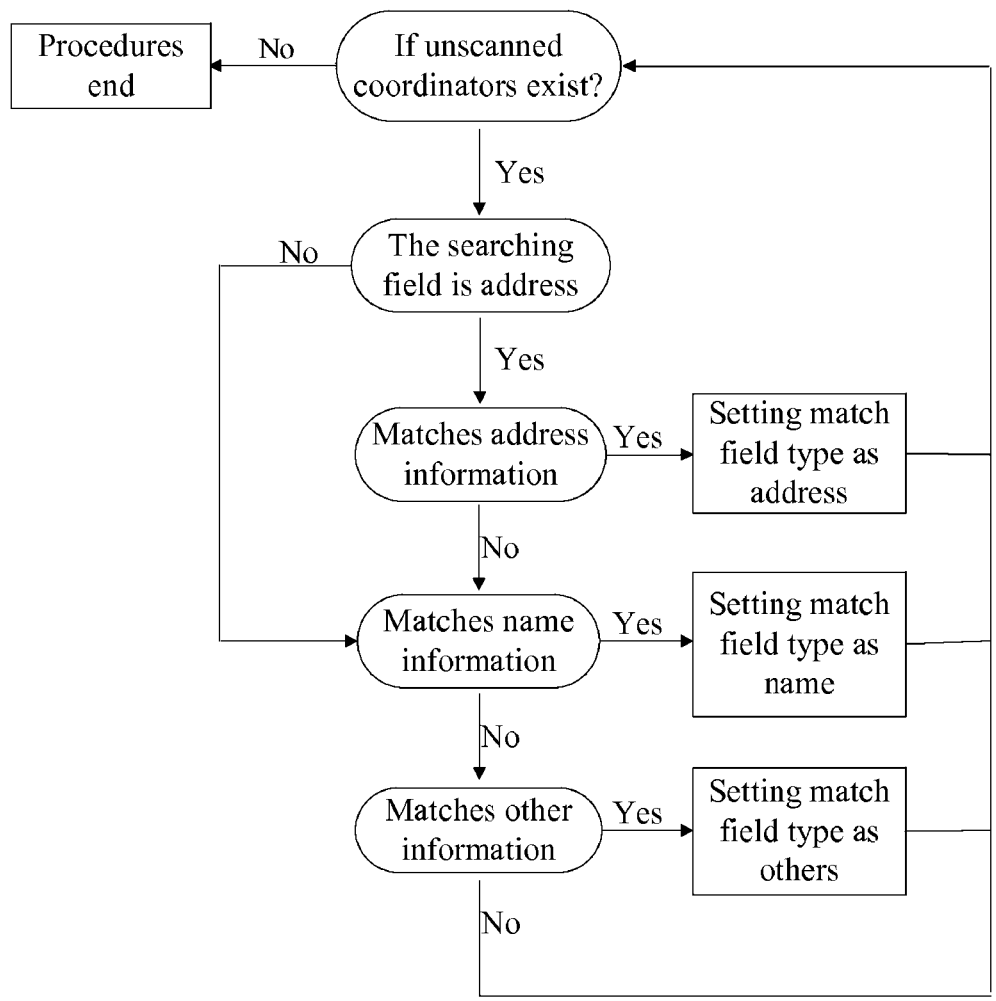
FIG. 5 is a block diagram showing full visiting card information scanning process.
Figure 6:
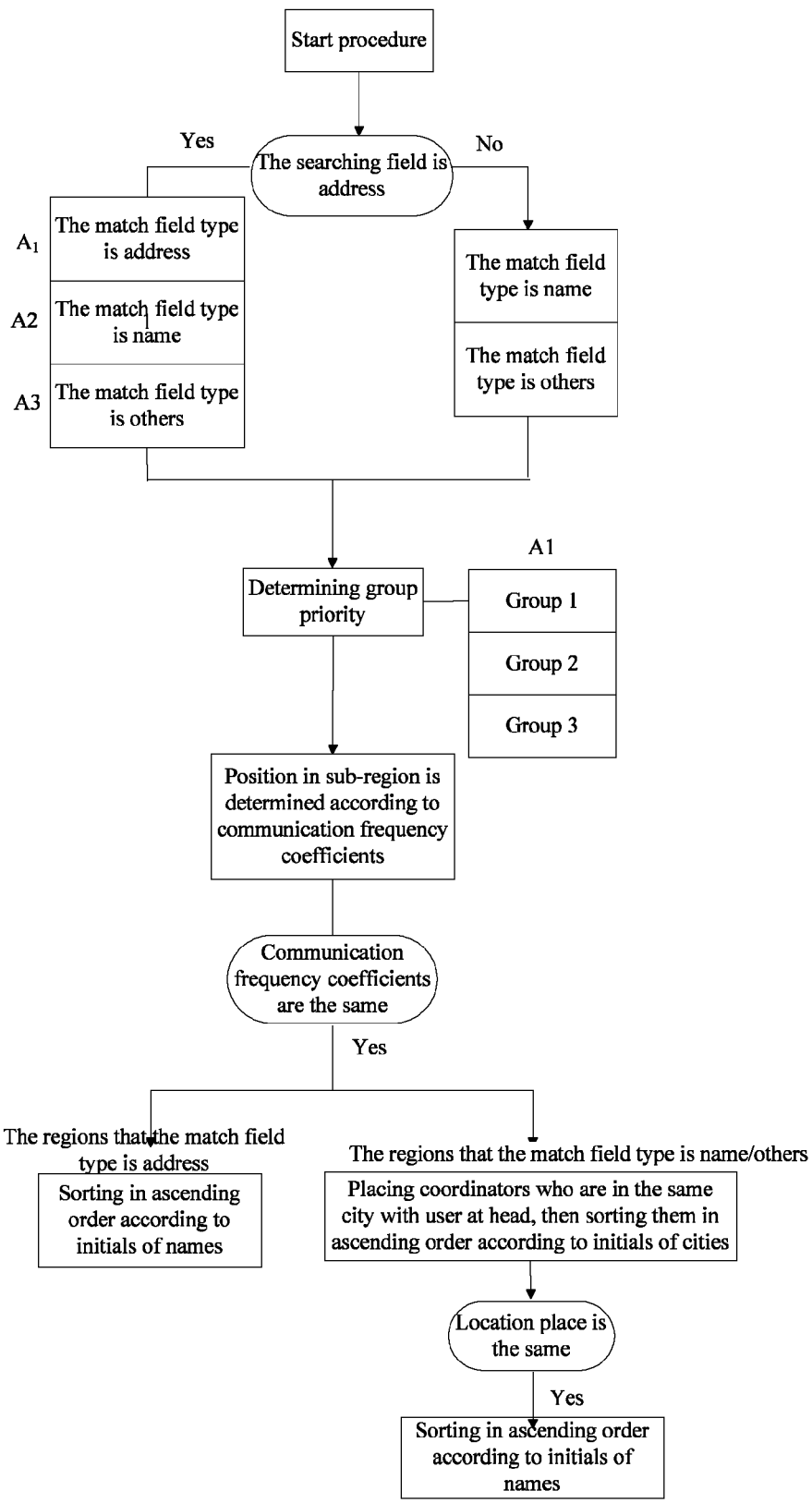
FIG. 6 is a block diagram showing target items sorting process.

FIG. 1 is a block diagram showing the general flow process of the invention. When users input a searching field, firstly city name match is performed, and if the city name match succeeds, the city name and district number are displayed in mobile communication device, otherwise nothing is displayed. Then according to determination if the searching field is address or not, the searching sequence of visiting card information is decided, then vague searching is made to full visiting card information of all coordinators in the address book, target item is further produced, and match types of the target items are respectively address/name/others, or name/others. Finally the produced target items are sorted by taking consideration of multiple dimensions of communication frequency, belonging relative (group), user's current location and local time of mobile phone, etc. FIG. 5 depicts vague searching process of full visiting card information, and FIG. 6 shows sorting process of target items.

Figure 2:
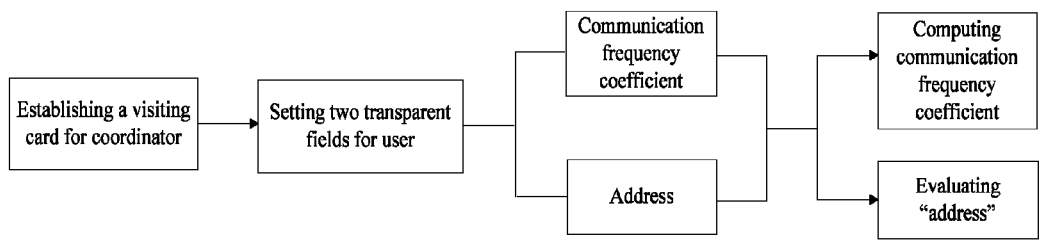
FIG. 2 shows attributes evaluating operation after new coordinators added.
Figure 3:
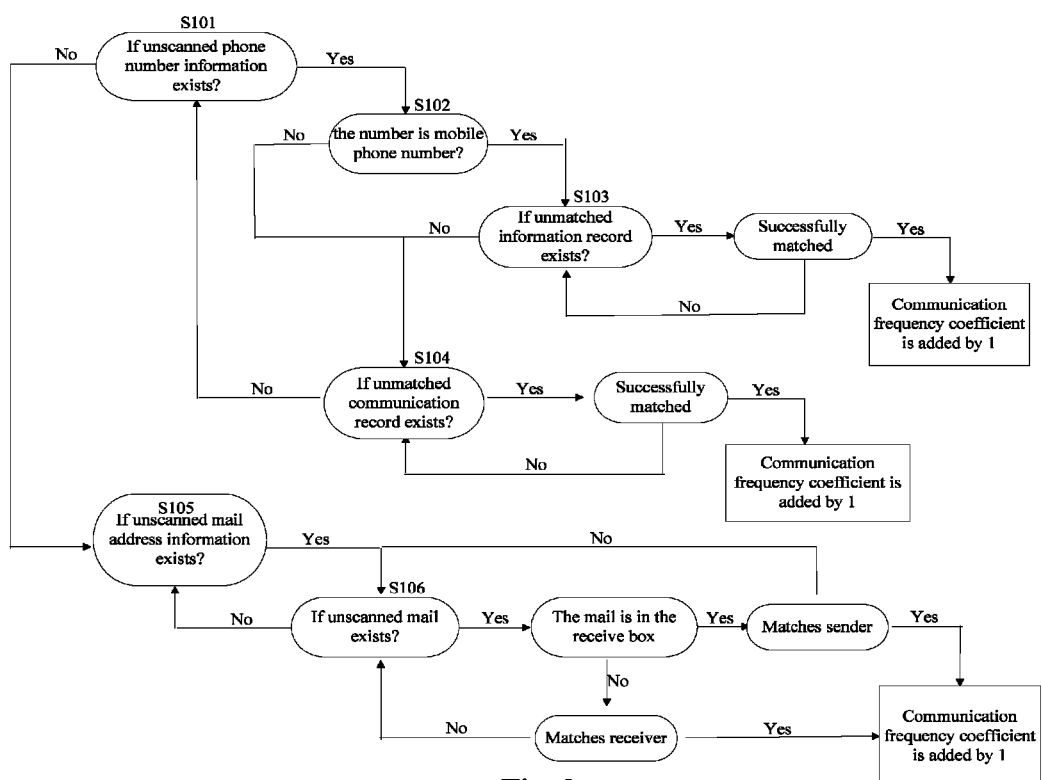
FIG. 3 is a block diagram showing operation steps of computing communication frequency coefficient.
Figure 4:
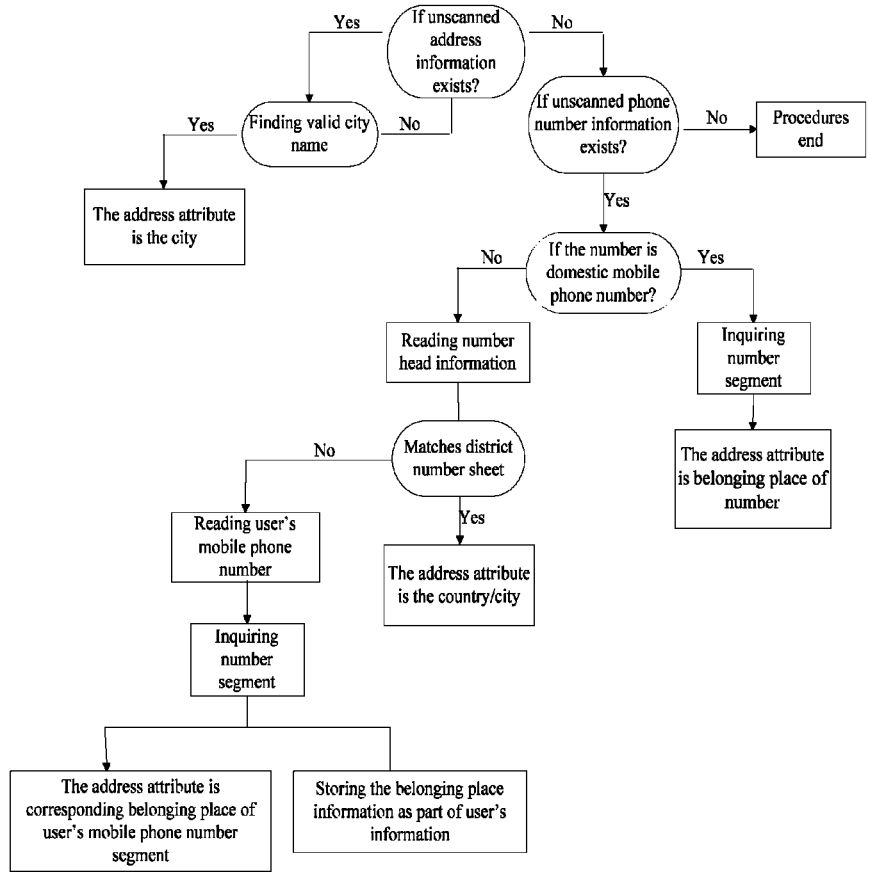
FIG. 4 is a block diagram showing address attributes evaluating process.

To meet requirement of sorting, system sets communication frequency coefficient attribute and address attribute for each coordinator, as shown in FIG. 2. After user sets visiting card for new coordinator, system sets two attributes for the coordinator: communication frequency coefficient and address, which are transparent to user, and the original value of the communication frequency coefficient is set as 0 and the original value of the address is set as nothing. Then computing frequency coefficient process and address inquiring process are started to evaluate communication frequency coefficient and address attribute. At begin, the original value of communication frequency coefficient of new coordinator is set as 0, and the communication frequency coefficient will be added by 1 every time one short message produces; and the communication frequency coefficient will be added by 1 every time one communication record produces; and the communication frequency coefficient will be added by 1 every time one mail contact produces. Reference will be made in detail to the operation steps of computing communication frequency coefficient as shown in FIG. 3 and address attribute evaluating process as shown in FIG. 4. Coordinator's address attribute is determined by city name, coordinator's phone number segment or phone number head, or user's phone number segment.

As shown in FIG. 3, gathering coordinator's phone number information in step S101, and checking if unscanned phone number information exist or not; if unscanned phone number information exist, checking if the unscanned phone number is mobile phone number in step S102; if it is mobile phone number, checking if unmatched information record exist in step S103, i.e. automatically searching the number in "information" (as sender or receiver), first searching "receive box" and "send box" of short message, then searching "receive box" and "send box" of multimedia message, every time one message sent or received by the number is found, the communication frequency coefficient will be added by 1. However, if the detected number in step S102 is not mobile phone number, or unmatched information record cannot be detected in step S103, then checking if unmatched communication record exist in step S104, i.e. automatically searching the number in "communication record", first searching "answered call", then searching "not answered call", finally searching "dialed call", every time one relative number is found, the communication frequency coefficient is added by 1. If unmatched communication record is not found in step S104, returning to step S101. The above procedures are repeated until all relative numbers (mobile phone/family phone etc.) are scanned. If all phone number information are scanned, coordinator's mail address information is extracted in step S105, and checking if an unscanned mail address information exist; if it exists, automatically searching the address in "mailbox" in step S106 (as sender or receiver), every time one relative mail is found, the communication frequency is added by 1. If an unscanned mail is not found in step S106, returning to step S105. The above procedures are repeated, until all relative mail address are scanned. When all relative phone numbers and mail address information are scanned, computing process of communication frequency coefficient is implemented. Thus, all coordinators of the address book are endowed with corresponding attribute of the communication frequency coefficient.

Referring to FIG. 4, the address attribute evaluating process is described as follows: starting address inquiring process, and relative information of coordinators' address is scanned. If valid city name is found, the coordinators' address attribute is the city name. If unscanned address information don't exist, sequentially reading the coordinators' phone information, and the following steps is circularly executed, until address can be determined or all phone numbers are inquired; reading value of coordinators' phone number segment; if the number is domestic mobile phone number, extracting valid number to inquire number segment, when the inquiring implements, coordinators' address attribute is corresponding belonging place of the number segment; if the coordinator's number is not domestic phone number, extracting number head information, and searching in district number sheet, if succeed, the coordinators' address attribute is corresponding country or city of the district number; if the above operations all fail, reading user's phone number, to make number segment inquiring, and when the searching implements, coordinators' address attribute is corresponding belonging place of user's phone number segment, and storing the belonging place information as part of user's information, and address attribute evaluating process ends. Thus, all coordinators of the address book are endowed with corresponding address attributes.

Holiday sheet, city district number sheet and phone number segment belonging sheet in the mobile phone are used to determine information of holidays, obtain city district number and belonging place of mobile phone.

After evaluating process of the above communication frequency coefficient and address attribute, each coordinator of the address book is simultaneously endowed with communication frequency attribute and address attribute.

Detailed description will be made in the following on how to search full visiting card information in the address book and rapidly find target coordinators by taking consideration of multi-dimensional information of user's current address, local time and date of mobile phone, belonging relative (group), and communication frequency coefficient, etc., so as to increase searching efficiency.

After user inputs a searching field, system determines if the searching field is address or not, if yes, three first layer regions generate, respectively corresponding to first layer region $A_1$ with match field type as address, first layer region $A_2$ with match field type as name and first layer region layer $A_3$ with match field type as others; if the searching field is not determined as address, two first layer regions generate, respectively corresponding to first layer region $A_2$ with match field type as name and first layer region $A_3$ with match field type as others. Then the system reads local time and date of mobile phone, which are divided into a plurality of second layer regions according to group priority in each first layer region. For example, local time and date of user's mobile phone are determined, i.e. reading date, what day and time of mobile phone. Comparing date with holiday sheet, to determined if it's certain holiday, if yes, relative groups of family, relatives and friends take precedence, and decreasing priority of relative groups of colleagues and partners; if it's only weekend, relative groups of friends and family take precedence, and decreasing priority of relative groups of colleagues, relatives and partners; if it's working day, first determine if the time is working time, if yes, relative groups of partners and colleagues take precedence, and decreasing relative groups of friends, family and relatives; if it's non-working time, relative groups of family, friends and colleagues take precedence, and decreasing priority of relative groups of partners and relatives. Thus pluralities of second layer regions with different priorities are established in each first layer region. After that, searching full visiting card information in the address book, scanning the address book according to order of existing items, for each coordinator, making vague match with searching field, scanning information of the visiting card one by one, once match succeeds, recording match field type (name/address/others), assigning coordinators to different second layer regions according to coordinator's match field type and group. For example, when the searching field is address, all coordinators whose match field type is set as address are assigned to first layer region $A_1$ with corresponding match field type is address, and all coordinators whose match field type is set as name are assigned to first layer region $A_2$ with corresponding match field type is name, and all coordinators whose match field type is set as others are assigned to first layer region $A_3$ with corresponding match field type is others, and coordinators in each first layer region are directly assigned to corresponding second layer region because of their different belonging groups. For example, a coordinator whose match field type is address and belonging group is friend is automatically assigned to corresponding second layer region of friends group in first priority region $A_1$. When the searching field is not address, system will first search coordinator's name information. Thus, all coordinators whose match field type is set as name are assigned to first layer region $A_2$ with corresponding match field type is name, and all coordinators whose match field type is set as others are assigned to first layer region $A_3$ with corresponding match field type is others, and coordinators in each first layer region forms second layer region according to sort order of group priority. Then, system sorts coordinators in second layer region according to information of communication frequency coefficient, user's current address, and initials of name. For the detailed sorting process, explanation is made referring to FIG. 7.

Regarding searching process of full visiting card information, as shown in FIG. 5, during which, vague searching is made in visiting card scope according to the input searching field of user, and when the searching field is contained in coordinator's information, the coordinator is assigned in target list. Searching full visiting card information of the address book comprising the following steps: determining if the searching field is place name, if yes, reading coordinator's address attribute first, if the attribute value matches the searching field, the match field type is set as address, no longer searching the coordinator's other information. If address attributes match fails, searching other information in the visiting card sequentially, for example, if name match succeeds, the match field type is set as name, no longer searching the coordinator's other information. Or if other field match succeeds, the match field type is set as others. If place name is determined as nay, sequentially begin to search information in the visiting card, if name match succeeds, the match field type is set as name, no longer searching the coordinator's other information. When other field match succeeds, the match field type is set as others. Hence two sorting results will generate: 1) if the searching field is not place name, first coordinators whose name contains the field are listed, then coordinators whose other information in the visiting card contains the field are listed; 2) if the searching field is place name, first coordinators whose address attribute fits with the place name are listed, then coordinators whose name contains the field are listed, after that coordinators whose other information in the visiting card contains the field are listed. Regarding the above two sorting results, groups are sorted first according to group classification, then according to communication frequency coefficient attributes, finally according to address attributes and name.

After searching full visiting card information, the inventive method sorts coordinators based on multiple dimensions, further rapidly find target coordinator. For example, reading address determination result: reading determination result of local time and date of user's mobile phone; determining priority of relative groups according to the time and date determination result; deciding position of coordinators in separate group according to communication frequency coefficient attribute, address attribute and name, etc.

Sorting process of target items are described in the following in conjunction with FIG. 6. Firstly, results shown region is divided into a plurality of first layer region $A_i$. Then reading determination result of the searching field, if the searching field is address, the sequence of the first layer region is: match field type is address, match field type is name, and match field type is others; if the searching field is not address, sequence of the first layer region is: match field type is name, and match field type is others. Coordinators are sorted in separate first layer region according to multiple dimensions of group priority determined by the local time and date of user's mobile phone, coordinators' communication frequency system attribute, address attribute and name, etc.

Typical sorting methods in two conditions that when the match field type is address and when the match field type is name/others are separately introduced in the following.

When the match field type is address, first according to determination result of the local time and date of user's mobile phone, dividing the first layer region $A_i$ into several second layer regions $A_{ij}$ according to group priority; for the second layer region $A_{ij}$, reading coordinators' communication frequency coefficients, and sorting them from high to low; if coordinators' communication frequency coefficients are the same, sorting them in ascending order according to initials of coordinators' name, finally obtaining the target coordinators items which are sorted according to the priorities of match field type, group priority, communication frequency coefficient, and initials of names.

When the match field type is name/others, first according to determination result of the local time and date of user's mobile phone, dividing the first layer region $A_i$ into several second layer regions $A_{ij}$ according to group priority; for the second layer region $A_{ij}$, reading coordinators' communication frequency coefficients, and sorting them from high to low; if coordinators' communication frequency coefficients are the same, reading the coordinators' address attribute, wherein coordinators who are in the same city with user are listed at head, then sorting them in ascending order according to initials of cities; if communication frequency coefficient and address attribute are the same, sorting them in ascending order according to initials of names. Finally, the target coordinators items which are sorted according to the priorities of match field type, group priority, communication frequency coefficient, address attribute and initial of names are obtained. During the process, system generally determines user's located city according to accurate GPS information, if GPS location fails, reading user's mobile phone number, inquiring number segment, searching registration city of mobile phone, so that coordinators in the same city with user take precedence.

The said two sorting method is the default method of system, but not unique. Users can set different dimensions and priorities between dimensions to adjust the above sorting method according to the requirement.

It can be seen from the above, the invention can enlarges match scope of searching field, i.e. the searching scope is not only limited into names, etc.; but also showing different group priorities according to different date and time, for example, according to holidays and working days and working time and non-working time of working days to adjust sorting of groups. In addition, the invention also introduces concepts of communication frequency coefficient attribute and address attribute, thus coordinators in separate group are sorted according to the above attributes, so as to save searching time. For all coordinator in a certain city, city name can be used as searching condition, and inquiring corresponding district number.

The preferred embodiments of the invention are described herewith, including optimal mode of implementing the invention known by the inventor. Variants of those preferred embodiments are obvious for those ordinary skilled in the art based on the above description. Therefore, variations, alternatives and modifications of the invention are included in the scope defined as appended claims.

What is claimed is:

1. A method for multi-dimensional based sorting of coordinators in an address book of a mobile phone associated with a user, the address book comprising coordinators having respective visiting card information, the method comprising:
    determining whether an input searching field is an address, thereby generating a determination result;
    in accordance with the determination result, deciding a priority type of a first layer region for displaying a sorting result;
    reading the local time and the date of the mobile phone, and deciding a priority of relative groups based on the time and the date, so as to determine a preferential group of a second layer region in the said first layer region; and
    deciding a sort order of coordinators in a separate relative group in accordance with the coordinators' communication frequency coefficient attribute, address attribute, and the user's current address and name,
    wherein the address attribute is determined by the following actions:
        scanning relevant address information in the coordinators' visiting card information,
        if a valid city name is found, assigning the coordinator's address attribute to the city name;
        if a valid city name is not found, determining a number segment of a phone corresponding to the coordinator, assigning the coordinator's address attribute to the number segment;
        if determining the number segment fails, extracting number head information of the phone corresponding to the coordinator, determining a district number, and assigning the coordinator's address attribute is a country or city of the district number; and
        if the above procedures all fail, assigning the coordinator's address attribute to a corresponding belonging place of the user's phone number segment.

2. The method of claim 1,
    wherein when the searching field is an address, and wherein priority match field types of the first layer region are, in order of priority, the match field type being an address, the match field type being a name, and the match field type being others; and
    when the searching field is not an address, and wherein priority match field types of the first layer region are, in order of priority, the match field type being a name and the match field type being others.

3. The method of claim 1, wherein when the match field type is an address,
    dividing the first layer region where the match field type is an address into a plurality of second layer regions based on group priority; and
    in each second layer region, sorting coordinators from high to low according to communication frequency coefficients; and
    when the communication frequency coefficients are the same, sorting coordinators in ascending order according to initials of the coordinators' name.

4. The method of claim 1, wherein when the match field type is not an address,
    dividing the first layer region where the match field type is a name or others into a plurality of second layer regions based on group priority;
    in each second layer region, sorting coordinators from high to low according to communication frequency coefficients;
    when the communication frequency coefficients are the same, placing first the coordinator whose address attribute matches a user's current address, and sorting coordinators in ascending order according to initials of city names; and
    when the address attributes are the same, sorting coordinators in ascending order according to initials of the coordinators' name.

5. The method of claim 1, wherein a communication frequency coefficient attribute is determined by the following action:
    setting an original value of the coordinator's communication frequency coefficient to 0,
    adding 1 to the communication frequency coefficient every time one short message produces; and
    adding 1 to the communication frequency coefficient every time one communication record produces; and
    adding 1 to the communication frequency coefficient every time one mail contact produces.

* * * * *